(12) United States Patent
Marchi

(10) Patent No.: US 7,556,474 B2
(45) Date of Patent: Jul. 7, 2009

(54) TURBOMACHINE, FOR EXAMPLE A TURBOJET FOR AN AIRPLANE

(75) Inventor: Marc Marchi, Le Mee (FR)

(73) Assignee: Snecma, Paris (JP)

( * ) Notice: Subject to any disclaimer, the term of this patent is extended or adjusted under 35 U.S.C. 154(b) by 623 days.

(21) Appl. No.: 11/068,744

(22) Filed: Mar. 2, 2005

(65) Prior Publication Data

US 2005/0249590 A1 Nov. 10, 2005

(30) Foreign Application Priority Data

Mar. 3, 2004 (FR) .................................. 04 02172

(51) Int. Cl.
*F01D 5/14* (2006.01)
(52) U.S. Cl. ..................... 415/115; 415/174.5; 415/175
(58) Field of Classification Search ................. 415/115, 415/173.5, 174.5, 175; 416/97 R, 160
See application file for complete search history.

(56) References Cited

U.S. PATENT DOCUMENTS

| 3,728,042 | A | | 4/1973 | Hugoson et al. | |
| 3,768,924 | A | * | 10/1973 | Corsmeier et al. | ............ 416/95 |
| 3,814,539 | A | * | 6/1974 | Klompas | ...................... 416/95 |
| 3,989,410 | A | * | 11/1976 | Ferrari | ........................ 415/115 |
| 4,582,467 | A | * | 4/1986 | Kisling | ........................ 416/95 |
| 5,143,512 | A | * | 9/1992 | Corsmeier et al. | .......... 415/115 |

FOREIGN PATENT DOCUMENTS

GB 947553 1/1964

\* cited by examiner

*Primary Examiner*—Edward Look
*Assistant Examiner*—Aaron R Eastman
(74) *Attorney, Agent, or Firm*—Oblon, Spivak, McClelland, Maier & Neustadt, P.C.

(57) ABSTRACT

A turbomachine including a wheel with hollow blades that are cooled internally by a forced flow of cooling air. According to an important characteristic of the invention, a hook-annulus (70) is interposed between the outer edge of the labyrinth-disk (52) and the rotor disk (36), the hook-annulus including a retaining shoulder (72) constituting an outer annular hook in which the outer edge of the labyrinth-disk is engaged, and a bearing shoulder (74) constituting an inner hook engaged in a groove around the circumference of the rotor disk.

14 Claims, 4 Drawing Sheets

TURBOMACHINE, FOR EXAMPLE A TURBOJET FOR AN AIRPLANE

The invention relates to a turbomachine, such as a turbojet for an airplane, for example. The invention relates more particularly to cooling the rotor blades of a high-pressure turbine, rotated by the energy of combustion gas escaping from an annular combustion chamber.

A conventional turbojet includes a plurality of turbines and, in particular, a high-pressure turbine, in which a blade wheel is arranged downstream from an annular discharge nozzle from a combustion chamber into which fuel and air under pressure are injected continuously in order to sustain combustion. The blade wheel serves to drive the air compressor which feeds air to said combustion chamber.

The blades of the wheel need to be cooled. To do this, it is known to use hollow blades. Each blade has a cavity inside which cooling air is forced to flow. A portion of the air delivered by the compressor bypasses the combustion chamber in order to be admitted into the blades and be ejected by said blades into the combustion gas stream downstream from the blade wheel.

The blade wheel consists of a rotary disk, also called a rotor disk, connected to a shaft which drives the compressor. The blades are engaged in sockets defined in the periphery of said rotary disk. Conventionally, the profile of such a socket is said to be "fir-tree" shaped and each blade has an enlargement, called a "blade root", of a shape that corresponds to the shape of the socket, and that is engaged therein. An air flow passage remains between the bottom of the socket and the tip of the blade root. The cavity defined inside the blade communicates with said air flow passage.

In order to force the air to become engaged in those air flow passages, it is known to associate a so-called "labyrinth" disk with the rotary disk. Said labyrinth-disk is mounted facing a face of the rotary disk, and is shaped to direct a fraction of the air delivered by the compressor towards the air flow passages defined under the blade roots.

It is known to secure the labyrinth-disk and the rotor disk in the vicinity of the blade roots by interfitting shapes, which complicates manufacture of both disks. In fact, machining and de-burring those shapes is a lengthy and expensive operation. Moreover, when possible, it is preferable to eliminate all geometrical shapes that have discontinuities or small radii of curvature, since they lead to localized stress concentrations, which shortens the lifetime of the part. This is particularly relevant to interfitting-shape connections.

U.S. Pat. No. 6,540,477 describes an assembly for mounting a labyrinth-disk bearing against the periphery of a rotary disk, but that solution, without interfitting shapes, cannot prevent the labyrinth-disk from becoming deformed under the combined effects of centrifugal force and heat, which can cause air to leak and thus reduce the effectiveness of the cooling system.

The invention provides a solution to all those problems by providing an assembly without interfitting shapes whereby deformation of the labyrinth-disk is contained.

More particularly, the invention provides a turbomachine including a blade wheel having blades that are hollow and cooled internally by a forced flow of cooling air, each blade being mounted in the periphery of a rotor disk, the wheel being of the type in which a labyrinth-disk is associated with said rotor disk in order to define a cooling air supply circuit communicating with air-flow cavities defined in said blades and opening out in the tips of blade roots connected to said rotary disk, said labyrinth-disk channeling air towards said blade roots, said turbomachine being characterized in that a hook-annulus is interposed between the outer edge of said labyrinth-disk and said rotor disk, in that said hook-annulus includes a retaining shoulder constituting an outer annular hook in which the outer edge of said labyrinth-disk is engaged, and a bearing shoulder constituting an inner annular hook that is engaged in an axial groove around the circumference of said rotor disk, and in that said hook-annulus includes air flow passages so that air can flow towards the blade roots.

The hook-annulus has holes disposed facing sockets defined in the periphery of the rotor disk and in which said blade roots are engaged.

Advantageously, the labyrinth-disk is mounted bearing against the periphery of said hook-annulus, with axial pre-stress.

The invention will be better understood, and other advantages thereof will appear more clearly on reading the following description of a turbomachine of the invention, said description being given solely by way of example and with reference to the accompanying drawings in which.

Figure 1:
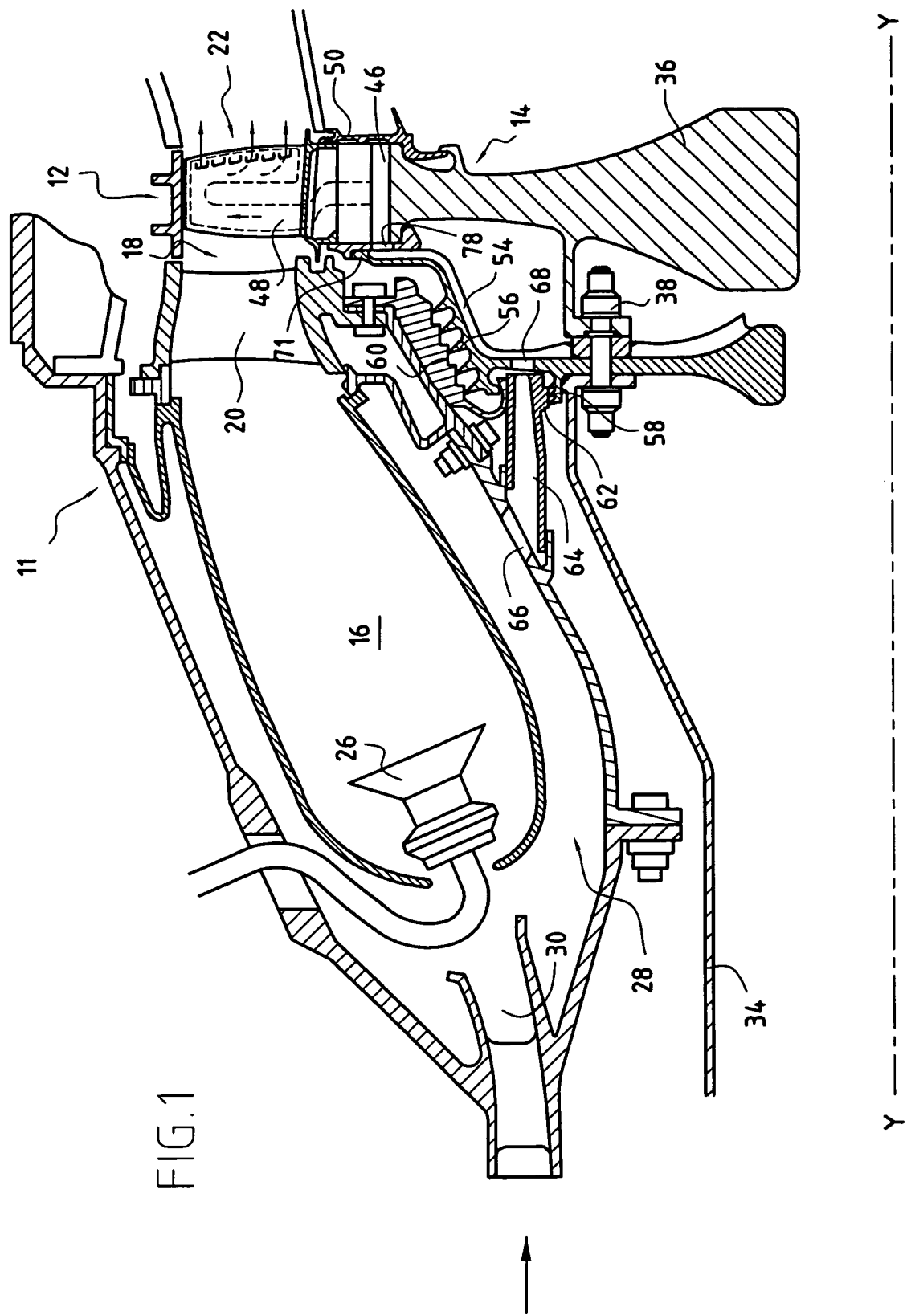
FIG. 1 is a fragmentary diagrammatic view of a turbojet in accordance with the invention, showing more particularly the high-pressure turbine and its cooling system.

In the drawings, all the parts shown are axi-symmetrical, of axis Y'-Y, the moving parts having said axis as an axis of rotation. More particularly, with reference to FIGS. 1 to 3, a portion of a turbojet 11 is shown and, in particular, a high-pressure turbine 12 associated with an annular combustion chamber 16. The turbine essentially comprises a blade wheel 14 that is rotated by gas escaping from the combustion chamber 16. The annular discharge nozzle 18 of said combustion chamber is provided with stator blades 20 that direct the gas towards the blades 22 of said blade wheel. Injectors 26 are arranged in a ring in the end wall of the combustion chamber 16. Said combustion chamber is mounted inside an annular casing 28 which includes a ring of air inlet orifices 30 receiving air under pressure as delivered by a compressor (not shown), said compressor being driven by a hollow shaft 34, of axis Y'-Y, on which the blade wheel 14 is mounted. Most of the air under pressure that is introduced into the casing 28 goes into the combustion chamber where it serves as an oxidizer.

The blade wheel 14 has a rotor disk 36 secured to the shaft 34 by bolts 38. In its outer periphery, said disk has elongate sockets 40, of constant right section of the known so-called "fir tree" profile. Said sockets are regularly distributed around the circumference of the periphery of the rotor disk 36. The blades 22 are fixed in said sockets. To this end, each blade has an enlargement or blade root 44 of profile corresponding to the profile of the radially outermost portion of the socket in which said blade is engaged. Nonetheless, an air flow passage 46 exists between the bottom of each socket and the blade root 44 that is engaged in said socket. As described below, the air flow passages 46 are used for passing cooling air to the blades placed facing the annular discharge nozzle 18 of the combustion chamber 16.

Indeed, in known manner, each blade has a cavity 48 inside which cooling air is forced to flow, said air being drawn from the casing 28. Thus, a fraction of the air delivered by the compressor bypasses the combustion chamber 16 in order to be admitted into the blades 22, through which it flows before being ejected from said blades, mainly via orifices that extend along the trailing edges of said blades. The ejected air mixes with the combustion gas stream that has passed through the blade wheel 14, said stream being channeled towards another turbine (not shown). Each air flow cavity 48 opens out into the above-defined air flow passage 46, at a tip of a blade root 44. On the downstream side of the blade wheel, the axial ends of the sockets (and, consequently, of the air flow passages 46) are covered by an annulus 50. On the upstream side, a labyrinth-disk 52 is secured to the rotor disk 36 that co-operates with said rotor disk to define a cooling air supply circuit that communicates with the set of air flow passages 46 situated under the blade roots.

The labyrinth-disk 52 is attached to the rotor disk 36 and to the shaft 34 by the same set of bolts 38. Said labyrinth-disk has radially-extending stiffening ribs 54 facing the rotor disk. Gaskets are defined by annular teeth 56, 58 that cooperate with corresponding annular surfaces 60, 62 secured to the casing 28. A nozzle of annular structure extends between a succession of outlet orifices 66 made through the wall of the casing and a series of inlet orifices 68 made through the wall of the labyrinth-disk for taking a fraction of the air that is injected into the casing 28. Thus, the air under pressure is constantly injected into an annular space defined between the labyrinth-disk and the rotor disk. As described below, said annular space communicates with the air flow passages 46.

According to a remarkable characteristic of the invention, a hook-annulus 70 is interposed between the outer edge 71 of the labyrinth-disk 52 and said rotor disk 14, in order to stabilize the position of said outer edge 71 of the labyrinth-disk when said labyrinth-disk becomes deformed under the effect of centrifugal force and heat. For this purpose, the hook-annulus 70 has a retaining shoulder 72 constituting an outer annular hook 71 in which the outer edge of the labyrinth-disk is engaged, and a support shoulder 74 constituting an inner annular hook 75 engaged in an axial groove 76 around the circumference of the rotor disk 36. Moreover, the hook-annulus has air flow passages allowing air to flow towards the blade roots. More precisely, the hook-annulus has holes 78 disposed facing the ends of the sockets 40 defined in the periphery of the rotor disk and receiving respective blade roots. The hook-annulus 70 is provided with indexing relative to the rotor disk 36 so that the holes 78 are properly disposed in register with the sockets. Moreover, each hole 78 made in the hook-annulus 70 advantageously has an outline similar to the outline of the cross-section of the air flow passage 46 defined in the facing socket, under the corresponding blade root. This feature is particularly visible in FIG. 3. Head losses are thus reduced in this portion of the air flow circuit.

Figure 4:
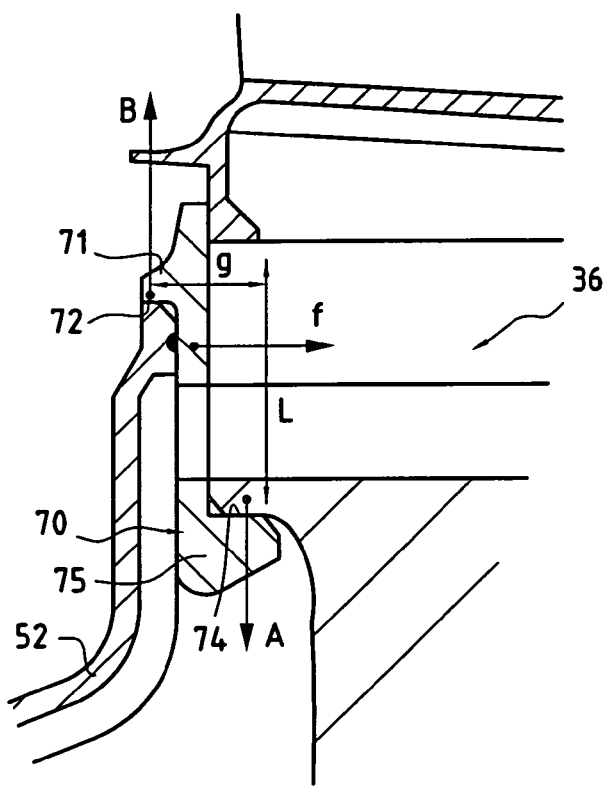
FIG. 4 is a diagram showing the interactions between the portions assembled in accordance with the invention.

As shown in the diagram of FIG. 4, the centrifugal force B exerted by the labyrinth-disk on the hook-annulus at the bearing point formed by shoulder 72 causes a reaction A at the bearing point formed by shoulder 74. If g represents the axial offset between A and B, a couple gA causes an action f by the radially outermost portion of the hook-annulus directed towards the rotor disk 36, with f=Ag/L, where L is the radial distance between the shoulder 74 and bearing point f. Thus, said action f prevents air from leaking between the rotor disk and the hook-annulus by making said hook-annulus bear more heavily against the rotor disk.

Moreover, the labyrinth-disk 52 is mounted bearing against the periphery of the hook-annulus 70, with axial pre-stress. Optionally, a gasket 80 can be placed between the labyrinth-disk and the hook-annulus in the peripheral bearing zone between said labyrinth-disk and said hook-annulus. The labyrinth-disk 58 has peripheral reinforcement that facilitates its engagement in the retaining shoulder 72 of the hook-annulus.

Figure 2:
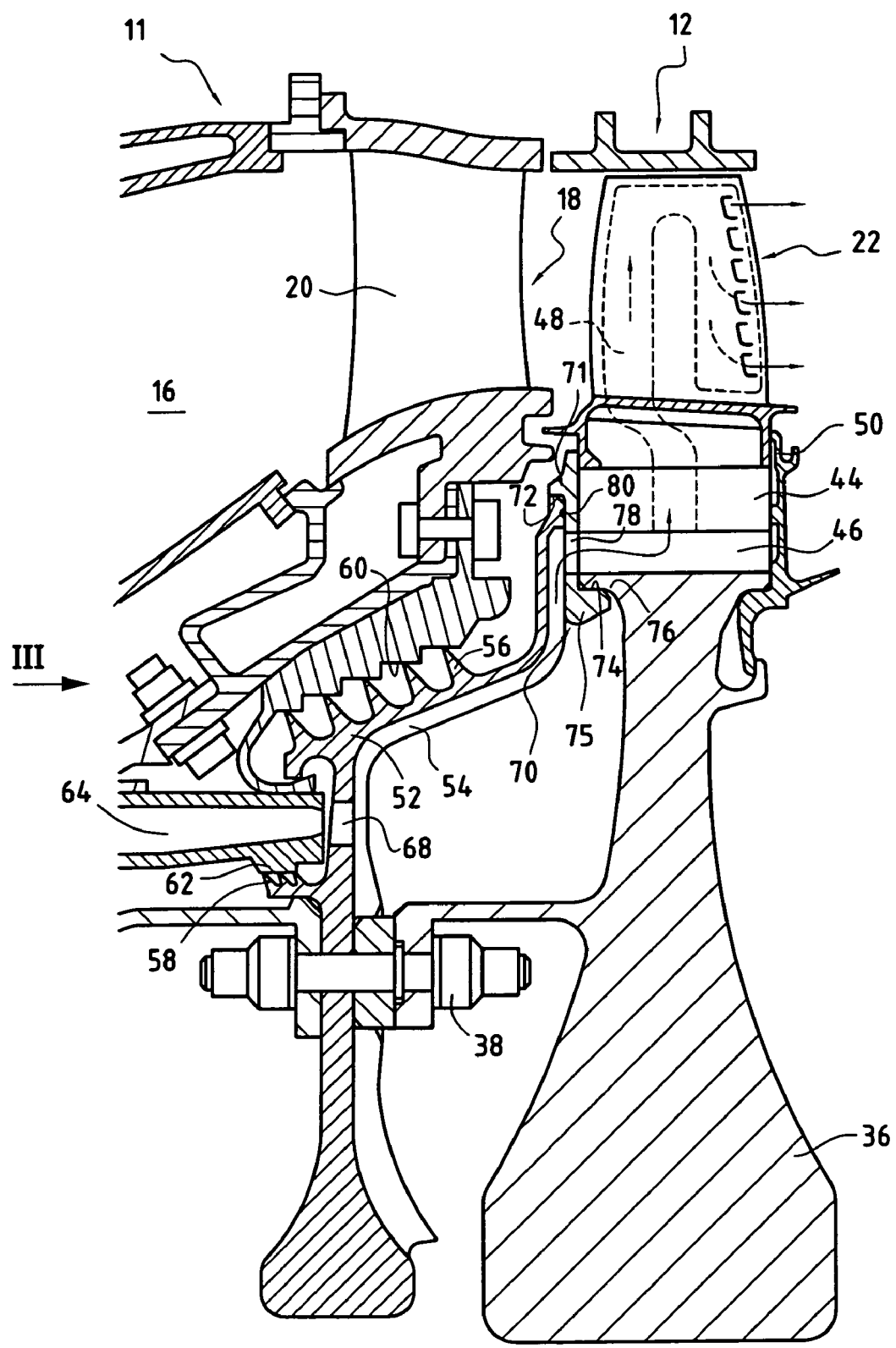
FIG. 2 is a detail view on a larger scale of a portion of FIG. 1.
Figure 3:
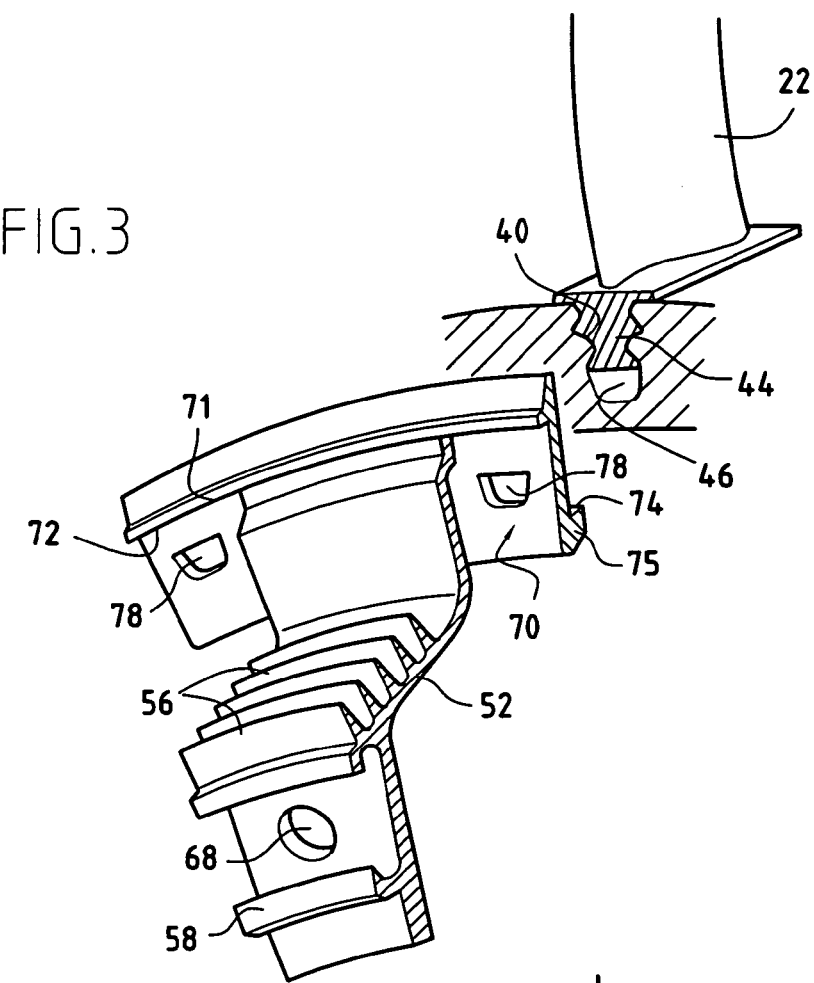
FIG. 3 is a fragmentary exploded perspective view looking along arrow III in FIG. 2.
Figure 5:
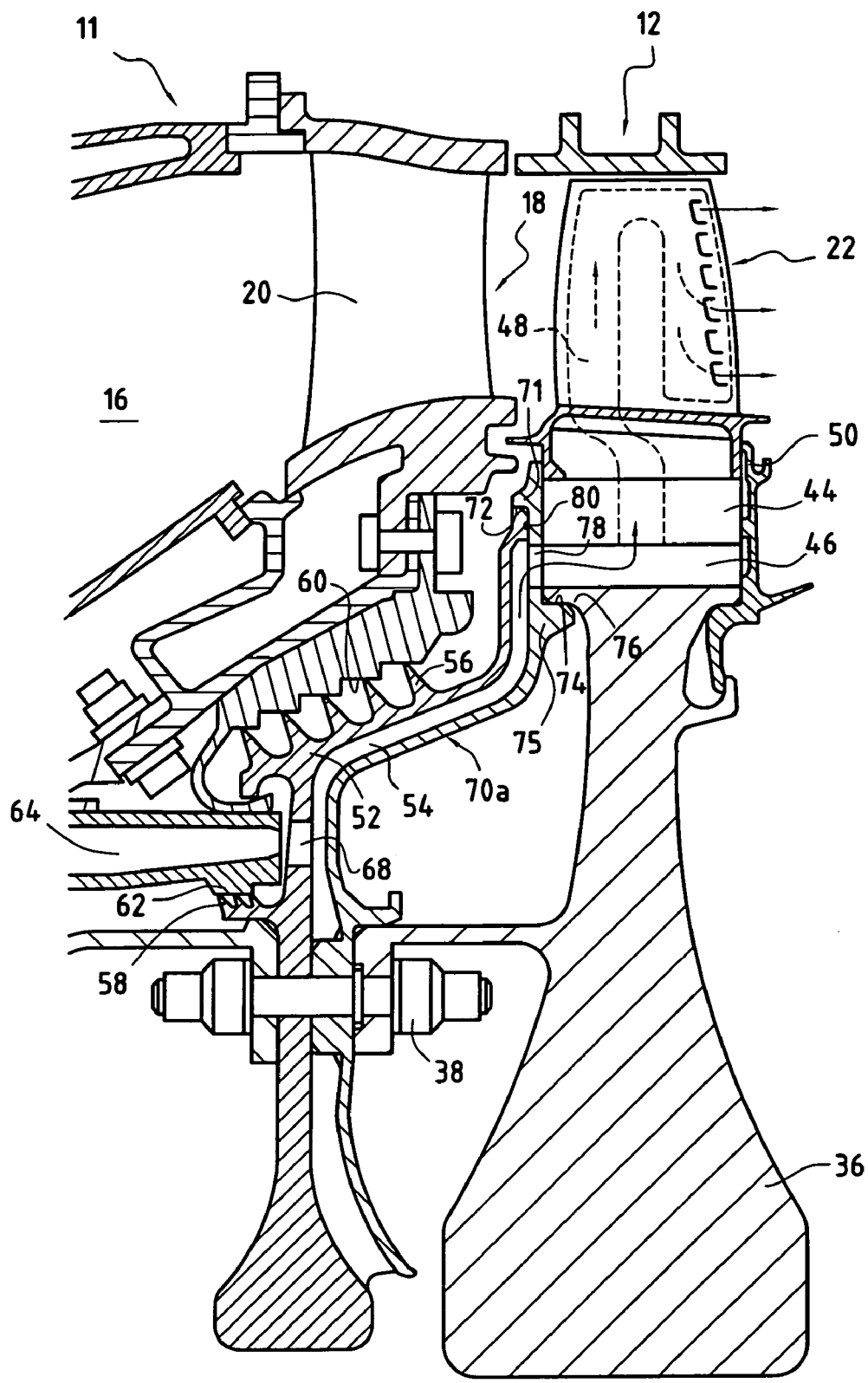
FIG. 5 is a view identical to FIG. 2 showing a variant.

In the variant shown in FIG. 5, the structural elements that are identical to structural elements of the embodiment shown in FIGS. 1 to 3 have the same reference numbers and are not described again. This variant differs in that the hook-annulus 70a extends radially inwards beyond the bearing shoulder 74 facing the labyrinth-disk 52. Said hook-annulus is shaped so as to remain substantially pressed against the ribs 54 of said bearing shoulder. In this manner, the cooling air flow circuit is more clearly defined along the labyrinth-disk 52, between the ribs 54 of said labyrinth-disk.

In operation, a fraction of the compressed air injected into the casing 28 escapes through the orifices 66 of said casing and is directed towards the hollow blades 22 of the blade wheel, in order to cool them, instead of serving as an oxidizer in the combustion chamber 16. The hook-disk 70 or 70a holds the outer edge of the labyrinth-disk in position and prevents any air leakage in the periphery of the labyrinth-disk.

The invention claimed is:

1. A turbomachine including a blade wheel having blades that are hollow and cooled internally by a forced flow of cooling air, each blade being mounted in the periphery of a rotor disk, the blade wheel including a labyrinth-disk associated with said rotor disk in order to define a cooling air supply circuit communicating with air-flow cavities defined in said blades and opening out in the tips of blade roots connected to said rotary disk, said labyrinth-disk having radially-extending stiffening ribs wherein air is channeled between the ribs toward said blade roots, wherein a hook-annulus is interposed between the outer edge of said labyrinth-disk and said rotor disk, said hook-annulus being a distinct part from said labyrinth-disk, wherein said hook-annulus extends between an outer circumferential edge and an inner circumferential edge, said outer circumferential edge defining on an upstream side a retaining shoulder constituting an outer annular hook in which the outer edge of said labyrinth-disk is engaged, said outer circumferential edge further defining on a downstream side a surface that bears against said rotor disk, and said inner circumferential edge defining a bearing shoulder constituting an inner annular hook that is engaged in an axial groove around the circumference of said rotor disk, wherein said hook-annulus includes air flow passages so that air can flow towards the blade roots.

2. A turbomachine according to claim 1, wherein the hook-annulus has holes disposed facing sockets defined in the periphery of the rotor disk and receiving respective ones of the above-mentioned blades.

3. A turbomachine according to claim 2, wherein each hole made in said hook-annulus has an outline similar to the outline of the cross-section of an air flow passage defined in the facing socket, under the corresponding blade root.

4. A turbomachine according to claim 1, wherein said hook-annulus extends radially inwards beyond said bearing shoulder, facing said labyrinth-disk.

5. A turbomachine according to claim 1, wherein said labyrinth-disk is mounted bearing against the periphery of said hook-annulus, with axial pre-stress.

6. A turbomachine according to claim 5, wherein a gasket is placed between said labyrinth-disk and said hook-annulus in the above-mentioned peripheral bearing zone.

7. A turbomachine according to claim 1, wherein said hook-annulus extends radially between said outer circumferential edge and said inner circumferential edge such that said outer annular hook of said retaining shoulder is located radially outward relative to said inner annular hook of said bearing shoulder.

8. A turbomachine according to claim 7, wherein said labyrinth-disk bears radially against said retaining shoulder.

9. A turbomachine according to claim 8, wherein said surface of said outer circumferential edge bears axially against said rotor disk.

10. A turbomachine according to claim 7, wherein said surface of said outer circumferential edge is radially aligned with a radial surface of said inner annular hook of said bearing shoulder.

11. A turbomachine according to claim 10, wherein said inner annular hook of said bearing shoulder has an axial surface that bears radially against said rotor disk.

12. A turbomachine according to claim 1, wherein said turbomachine is free of any screw connecting said hook-annulus to said rotor disk.

13. A turbomachine according to claim 1, wherein a radially outward centrifugal force exerted by the labyrinth-disk on the hook-annulus at said retaining shoulder causes a radially inward reaction force at the bearing shoulder, wherein said centrifugal and reaction forces combine to cause an action by the hook-annulus towards the rotor disk so as to prevent air from leaking between said hook-annulus and said rotor disk.

14. A turbomachine according to claim 1, wherein said hook-annulus bears against said rotor disk between said inner and outer circumferential edges.

* * * * *